United States Patent [19]

Becker

[11] Patent Number: 4,870,732
[45] Date of Patent: Oct. 3, 1989

[54] STAINLESS STEEL WELD CLAD CYLINDER ROLLER INTERCONNECTED BY A GROOVE AND GAP ALSO WELD COVERED BY STAINLESS STEEL

[75] Inventor: John H. Becker, Portsmouth, N.H.

[73] Assignee: Harris Graphics Corporation, Dover, N.H.

[21] Appl. No.: 257,397

[22] Filed: Oct. 13, 1988

Related U.S. Application Data

[62] Division of Ser. No. 185,866, Apr. 25, 1988, Pat. No. 4,826,071.

[51] Int. Cl.$^4$ .................. B21B 31/08; B41F 13/10; B23K 9/04
[52] U.S. Cl. .................. 29/121.5; 29/121.1; 29/132; 101/375; 219/76.14
[58] Field of Search ........... 29/121.1, 121.5, 132; 219/76.1, 76.12, 76.14; 101/375, 415.1

[56] References Cited

U.S. PATENT DOCUMENTS

| | | | |
|---|---|---|---|
| 1,934,064 | 11/1933 | Hermanson et al. | 219/76.12 |
| 2,177,868 | 10/1939 | Chapman | 219/76.14 |
| 4,525,909 | 7/1985 | Newman | 29/121.1 |

FOREIGN PATENT DOCUMENTS 39166  4/1981  Japan .................. 219/76.1

*Primary Examiner*—Timothy V. Eley
*Assistant Examiner*—Peter Dungba Vo
*Attorney, Agent, or Firm*—Tarolli, Sundheim & Covell

[57] ABSTRACT

A stainless steel cylinder roller comprises a longitudinal groove formed in the cylinder. The groove has opposed edges extending from the outer surface of the cylinder inwardly with reference to the longitudinal axis of the cylinder. A weld covering is on the cylinder and extends into the groove and covers the edges. The depth of the weld on the edge being greater than the depth of the weld on the outer surface of the cylinder.

3 Claims, 2 Drawing Sheets

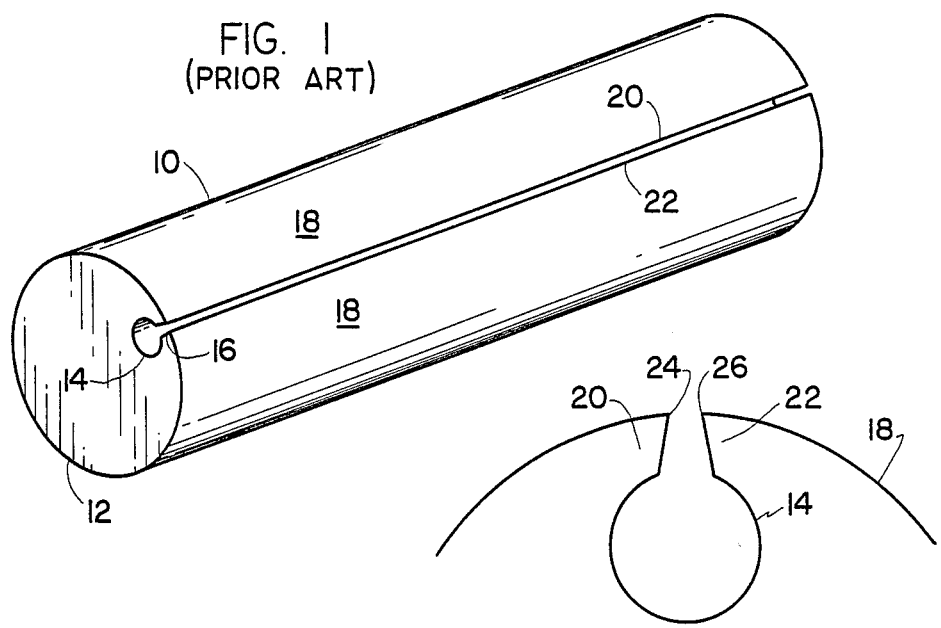
FIG. 1 (PRIOR ART)
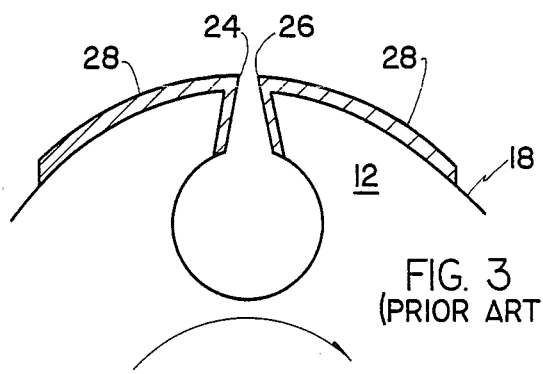
FIG. 2 (PRIOR ART)
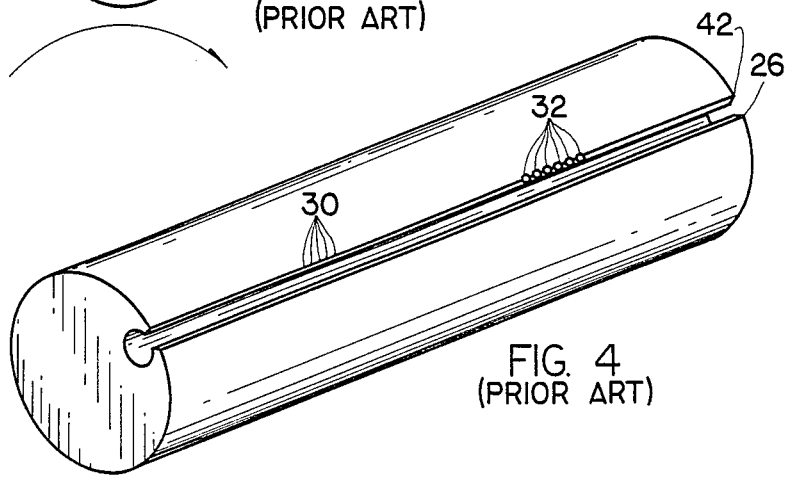
FIG. 3 (PRIOR ART)
FIG. 4 (PRIOR ART)

STAINLESS STEEL WELD CLAD CYLINDER ROLLER INTERCONNECTED BY A GROOVE AND GAP ALSO WELD COVERED BY STAINLESS STEEL

This is a divisional of co-pending application Ser. No. 185,866 filed on Apr. 25, 1988, now U.S. Pat. No. 4,826,071.

BACKGROUND AND BRIEF SUMMARY OF THE INVENTION

High speed web type printing presses consist of two side frames which are bolted together by spacer pieces. The frames carry several high peripheral speed cylindrical rollers, some of which hold a master print form. These master print forms are coated with various colors of ink. The inks are typically solvent based and are mildly corrosive to the face of the rollers. Most of the rollers used are non stainless steel. Their diameters are from 4 to 16 inches and they may be up to 96 inches in length.

Each roller contains a cut deep channel or slot which is parallel to the longitudinal axis of the roller. Into this slot is inserted a "locking" device which positions and firmly fastens the master print form to the high speed turning roller. The outer surface of the roller is coated with a hard chrome surface which prevents chemical corrosion of the cylinder body. In addition the opposed walls of the slot are also chromed a fixed distance from the outer surface of the roller inwardly. It is extremely difficult to plate the walls of the slot and particularly the edges defined by the roller surface and the walls of the slot. It has been found that these edges and wall surfaces typically have pin holes and/or blisters. The solvents in the inks permeate through the pin holes and/or blisters and corrode the underlying surface. The corrosion results in the discoloration or streaking of the master print forms. When this corrosion condition exists, the cylinders must be replaced or reconditioned.

One solution would be the use of solid stainless forgings for the rollers but the cost is prohibitive. Another possible solution is stainless coatings of the surface of the cylinder and a stainless overlay of the slot opening. However, this practice is "blocked" metallurgically because the two interfaces are not metallurgically bound together such that they have a contiguous grain structure. Internal stresses at the grain boundaries of the respective welds develop allowing the solvents to permeate through, corroding the underlying surface.

The invention described herein is a method for coating cylindrical rollers that carry master print forms and the rollers produced by the process. A welded interface between a stainless covered roller surface and a weld overlay of the slot opening results in a homogeneous mixture of stainless welding free from internal stresses and produces a continuous uniform grain structure. The invention provides both a surface free of pin holes and bubbles and eliminates the need for the chrome plating of rollers.

The invention broadly comprises forming a weld preparation groove in the surface of a cylindrical roller, said groove being parallel to the longitudinal axis of the roller. The groove is filled with a weld material. Subsequently, the outer surface of the cylinder is welded with a compatible welding material to coat the cylinder surface. The weld materials both for the groove and the surface are compatible such that when the surface is welded, the weld material in the groove is recast to form a homogeneous grain structure with the surface weld. The slot is then formed and the surfaces of the facing walls of the slot, the slot edges and the roller surface are uniformly coated.

In a preferred embodiment, the weld material is stainless steel. However, the weld material may be selected from the following materials, which may be used alone or in combination, belonging to the stainless steel family and is referred to as the austenitic and martensitic chromium nickel group. As long as the weld material in the groove has the characteristic of being able to be recast when the roller surface is coated by welding and to reform into a grain structure which is homogeneous with the grain structure of the material used on the surface then that material is within the scope of the invention.

DESCRIPTION OF THE DRAWINGS

FIG. 1 is an isometric view of a prior art cylinder;
FIG. 2 is a partial end view of FIG. 1;
FIG. 3 is an end view of FIG. 2 chrome plated;
FIG. 4 is an isometric view of FIG. 1 with the prior art defects.

DESCRIPTION OF THE PREFERRED EMBODIMENT

Figure 5:
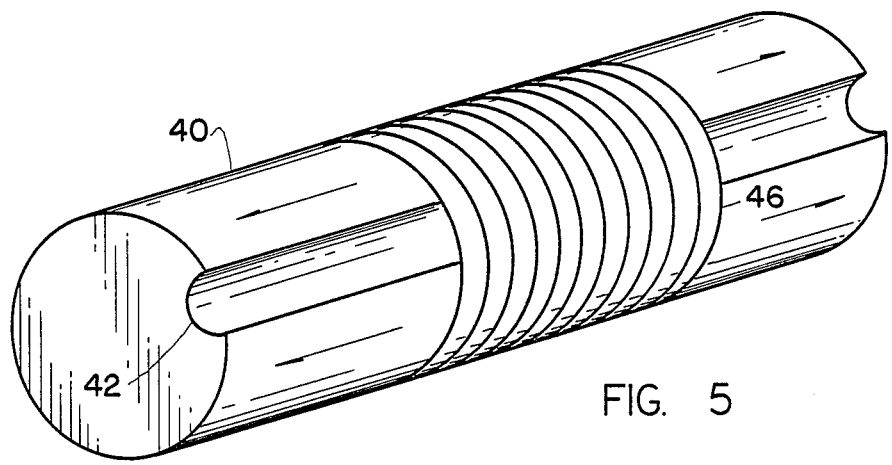
FIG. 5 is an isometric view of a cylinder of the invention showing the unwelded groove and the surface overlay welding.

FIGS. 1 and 2 illustrate a cylindrical roller 10, which would hold a master print form, comprising a metal body 12 characterized by a cylindrical passage 14 and a longtitudinal slot 16 formed in the outer body surface 18. The slot walls 20 and 22 define with the surface 18, edges 24 and 26.

FIG. 3 is an end view of roller 10 with chrome plating 28 on the cylinder surface 18, the plating also covering the walls 20 and 22 and edges 24 and 26. When chrome plating, say for example with a current density of 6,000 amp per square inch on the surface 18, the current density virtually reaches infinity on the edges 24 and 26. Thus, the edges on these rollers are the 'Achilles Heels' of the roller concerning the susceptibility to corrosion. It is extremely difficult to build up the plating on these edges.

FIG. 4 shows the plated edges with minute pin holes 30, or grape-like chrome beads 32 formed during the chroming process which later break off, both leaving corrosive voids.

FIG. 5 shows a roller 40 of the invention having a weld preparation groove 42 formed therein.

Figure 6:
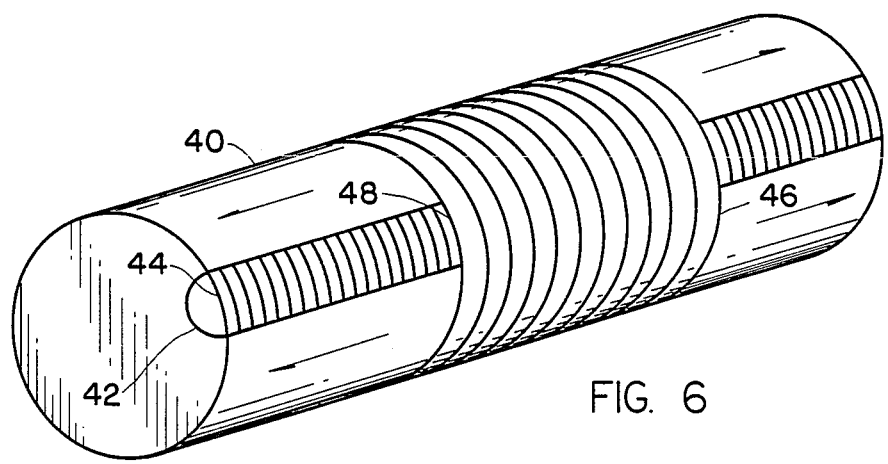
FIG. 6 is an isometric view of a cylinder of the invention containing a longitudinal weld and surface overlay welding.

FIG. 6 shows the roller 40 overlaid partially with stainless weld electrode overlay 46. Also, the groove 42 is filled with stainless weld electrode 44.

When the weld electrode overlay 46 passes over the weld electrode 44, a remelt casting process takes place at the interface between the welds thus forming a uniform metallurgical bond and grain structure resulting in an area 48 of homogeneous metal crystal grain structure. In practice, the overlay extends from one end of the roller 40 to the other.

Figure 7:
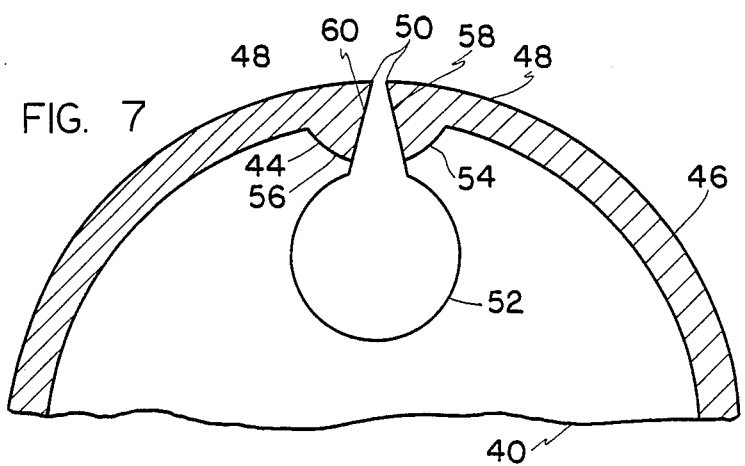
FIG. 7 is an end view of FIG. 6 after the slot has been cut.

FIG. 7 shows the cylinder 40 with a slot opening 50 cut through the solid stainless longitudinal weld 44 to the outer face of weld overlay 46. Also formed is a cylindrical passage 52. The opposed 'edges' 54 and 56 of the cylinder of the invention are concave surfaces. Comparing the edges 24 and 26, FIG. 3, with the edges 54 and 56 illustrates graphically how the prior art problem is overcome, namely, the coating on the 'edges' is relatively thick.

The method of making the cylinder of my invention will further be explained with reference to the following, nonlimiting example.

The thickness of the welds 58 and 60 are greater than the weld thickness on the surface.

Referring to FIG. 6, a cylinder 40, say for example 12 inches in diameter and 80 inches in length, has a groove 42 formed therein, the groove having the dimensions of approximately 1 to 2" wide and ½" deep. The groove is filled with the stainless weld electrode 44 by using various welding processes such as shielded metal arc, submerged arc welding, gas metal arc, gas tungsten arc, plasma arc and other welding techniques such as pulsating arc.

The entire surface is overlaid with stainless weld electrode overlay 46 by using similar processes as described previously. Subsequently, the slot 50 and cylindrical passageway 52 are formed in the cylinder by machining techniques including mill cutting, single point tool cutters, broaching or other close tolerance methods.

These techniques are well known in the art and need not be described in detail.

Having described my invention, what I now claim is:

1. A printing roller which comprises a stainless steel cylinder having
    a longitudinal groove formed in said cylinder, the groove having opposed edges extending from the outer surface of the cylinder inwardly with reference to the longitudinal axis of the cylinder, a weld covering on said cylinder and extending into said groove and covering said edges, the depth of the weld on the edge being greater than the depth of the weld on said surface.
2. The cylinder of claim 1 wherein the base of the weld on the edge is concave.
3. The cylinder of claim 1 wherein the weld material is stainless steel.

* * * * *